United States Patent [19]

Rohlfing et al.

[11] 4,220,572

[45] Sep. 2, 1980

[54] POLYVINYLIDENE FLUORIDE COMPOSITIONS OF IMPROVED THERMAL STABILITY

[75] Inventors: Wolfgang Rohlfing, Troisdorf; Peter Vanheiden, Bornheim-Hersel, both of Fed. Rep. of Germany

[73] Assignee: Dynamit Nobel Atkiengesellschaft, Troisdorf, Fed. Rep. of Germany

[21] Appl. No.: 911,011

[22] Filed: May 30, 1978

[30] Foreign Application Priority Data

Jun. 1, 1977 [DE] Fed. Rep. of Germany ....... 2724612

[51] Int. Cl.$^2$ .......................... C08K 3/32; C08K 5/51; C08K 5/53
[52] U.S. Cl. .......................... 260/45.95 L; 260/42.27; 260/45.7 P; 525/2; 526/255
[58] Field of Search ... 260/45.7 P, 45.95 L (U.S. only), 260/45.7 PT, 961; 526/255 (U.S. only)

[56] References Cited

U.S. PATENT DOCUMENTS

| | | | |
|---|---|---|---|
| 2,459,746 | 1/1949 | Radcliffe | 260/45.95 L |
| 2,510,777 | 6/1950 | Gray | 260/45.7 PT |
| 2,946,764 | 7/1960 | Fontoy et al. | 260/45.7 P |
| 3,106,539 | 10/1963 | Hendricks et al. | 260/45.75 V |
| 3,533,981 | 10/1970 | Franks et al. | 260/45.95 L |
| 3,645,991 | 2/1972 | Nersasian | 260/45.7 PT |
| 3,709,856 | 1/1973 | Dohany et al. | 526/255 |
| 3,878,274 | 4/1975 | Murayama et al. | 526/255 |
| 3,903,045 | 9/1975 | Chandrasekaran et al. | 260/45.7 P |

OTHER PUBLICATIONS

Van Wazer, "Phosphorus and Its Compounds", vol. 1, pp. 348, 359, 360 and 370.

Primary Examiner—Hosea E. Taylor
Assistant Examiner—R. A. White
Attorney, Agent, or Firm—Sprung, Felfe, Horn, Lynch & Kramer

[57] ABSTRACT

A heat stabilized polyvinylidene fluoride composition comprising polyvinylidene fluoride and a stabilizing amount of a phosphinate.

14 Claims, 1 Drawing Figure

POLYVINYLIDENE FLUORIDE COMPOSITIONS OF IMPROVED THERMAL STABILITY

BACKGROUND OF THE INVENTION

1. Field of the Invention

This invention relates to the stabilization of polyvinylidene fluoride (PVDF) especially polyvinylidene fluoride molding compositions. More especially, this invention relates to imparting improved thermal stability to polyvinylidene fluoride containing compositions. This invention particularly relates to improving the thermal stability of polyvinylidene fluoride at temperatures in excess of 200° C.

2. Discussion of the Prior Art

Polyvinylidene fluoride, being a partially crystalline and thermoplastic fluorinated polymer of high molecular weight, is finding increasing usefulness in the construction of chemical installations and apparatus, in machinery construction, and in the cable and electrical industry, on account of the combination which it offers of high chemical, mechanical and thermal stability.

Although the crystalline melting point of PVDF is 170° C., it is extruded and injection molded at mass temperatures of 220° to 300° C. on account of its high melt viscosity. At these temperatures, a dark discoloration of the fabricated PVDF is often produced. Such discolorations, which are caused by cellulose admixtures, can impair the usefulness and the further working of the products made from PVDF.

The problem accordingly existed of discovering suitable substances which would bring about an improvement of the natural color of thermally stressed PVDF compositions and which would not reduce the inherent good thermal stability of polyvinylidene fluoride. The addition of compounds which have a stabilizing or color improving action with PVC or PVF, such as, for example, pentaerythritol, dipentaerythritol, lead salts, organic tin compounds, ultra-violet stabilizers, optical brighteners or combinations of these substances produces, in the present case, no appreciable improvement of the color values.

SUMMARY OF THE INVENTION

In accordance with the present invention, thermally stabilized polyvinylidene fluoride containing compositions are provided, which compositions comprise polyvinylidene fluoride homo- or copolymers and a stabilizing amount of a phosphinate.

Surprisingly, in amounts of as little as 0.005 weight percent with respect to the total molding composition, the phosphinates produce thermostabilizing effects, whereas, for example, salts of meta-, pyro- and orthophosphoric acids, or phosphorous acid, and phosphides, and the phosphite chelators commonly used for color improvement, produce no effect. The action of the phosphinates manifests itself in a decided lightening of the color and in an improvement of thermal stability.

The phosphinates which can be used in accordance with the invention are salts, e.g., alkali or alkaline earth metal salts, and esters, especially $C_1$-$C_8$ alkyl esters, of phosphinic acid, which in common parlance is often referred to as subphosphorous or hypophosphoric acid. Phosphinic acid corresponds to the general formula $H_2P(O)OH$; in the phosphinates used in accordance with the invention, the hydrogen bound to the oxygen is replaced by a metal, preferably an alkali metal. The hydrogen atoms bound to the phosphorus atom can be replaced by an organic moiety (e.g., phenyl or alkyl).

The crystallized alkali metal salts of the formula, $$MeH_2PO_2 \cdot xH_2O,$$

which can be prepared in pure form, produce, in a proportion of as little as 0.005% of the polymer, a lightening of color and a positive effect on the thermal stability, and they are used preferably in amounts of less than 1.0%.

The copolymers containing a predominant proportion of PVDF are to be understood to be those copolymers in which the percentage of the PVDF amounts to more than 50%. The effect of the invention also is apparent in the case of mixtures of PVDF with other polymers (e.g., polyacrylic resins), which contain more than 50 weight percent of PVDF.

The phosphinates can be admixed directly in finely powdered form to the PVDF powder in the desired amounts, or a stock concentrate containing far more than 1% of phosphinates, preferably more than 5%, is prepared and added in portions to the PVDF composition as needed.

It is also possible to dissolve the effective amount of phosphinate in water and to add this solution to the PVDF in a hot mixer, and remove the excess water by a hot mixing process. The solubility of the phosphinates in water furthermore makes it possible to stir these compounds into the still moist polymer after the removal of the polymer from the the polymerization kettle.

By treating the PVDF with phosphinates immediately after polymerization, the product can be dried at a higher temperature to thereby achieve a shorter drying time than usual, without the danger of discoloration of the polymer.

The stabilizing action of the phosphinates is confirmed by thermogravimetric testing. In such tests the thermal decomposition rate of PVDF is measured in relation to the heating temperature. The measurements show that the amounts of degradation products from these mixtures at comparable temperatures is decidedly lower than in the case of unstabilized PVDF from the same batch.

It has furthermore been proven by measuring the weight loss that, through the addition of the claimed amounts of phosphinates, PVDF compositions can be fabricated with fillers which, due to their composition or to the impurities which they contain, reduce the thermal stability of PVDF. Examples of such fillers are aluminum, asbestos, iron oxides, glass, mica or carbon black.

BRIEF DESCRIPTION OF DRAWING

Referring to the accompanying drawing, the same represents a pair of graphs showing the quantitative effectiveness of the addition of sodium phosphinate on the thermogravimetrically determined weight loss at 350° C. On the x-axis is plotted the content of sodium phosphinate in weight percent with respect to the PVDF put in, and on the y-axis the weight loss in % at 350° C. Curve A shows the weight loss after 30 minutes of heating, Curve B after 60 minutes. The samples were prepared in accordance with Example 1. The addition of sodium phosphinate in amounts of as little as 0.005% results in a measurable reduction of the weight loss. The addition of 0.03% of phosphinate reduces the 60-minute weight loss by more than half, and in the case of this mixture it is to be considered the optimum amount to add.

In the thermoplastic fabrication of PVDF performed by conventional methods (extrusion, injection molding), the mixtures treated with phosphinate produce finished products which have a decidedly lighter color than those made from pure PVDF. The compositions can additonally contain other known stabilizers, such as, for example, pentaerythritol or dipentaerythritol. The addition of ultraviolet stabilizers, optical brighteners and/or dyes is also possible.

In order to more fully illustrate the nature of the invention and the manner of practicing the same, the following examples are presented:

EXAMPLES

EXAMPLE 1

1 Gram of $NaH_2PO_2.H_2O$ is finely ground, added to 2 kg of a PVDF powder obtained by suspension polymerization, and the mixture is intimately mixed in a suitable mixer. This powder mixture is injection molded at mass temperatures of 280° C. with the application of a high injection pressure to form standard test bars measuring 10×4 mm. The pieces obtained in this manner have a strikingly lighter color than those which are injection molded from the same batch of PVDF under the same conditions. The treated and untreated test bars were subjected to thermogravimetric analysis and the weight loss after 30 and 60 minutes at 350° C. was determined. The results are given in Table 1.

EXAMPLE 2

50 Grams of $NaH_2PO_2.H_2O$ are finely ground and carefully mixed with 1 kg of PVDF powder. This concentrate was stored with the exclusion of moisture. At the end of three months, 100 kg of suspension PVDF was mixed with 1 kg of this concentrate in a mixer, and granulated in a suitable extruding machine under conventional extrusion conditions. The granules obtained had a strikingly lighter color than equal granules which were prepared without the addition of the concentrate. The results of the thermogravimetric analysis are shown in Table 1.

EXAMPLE 3

5 Grams of crystallized $NaH_2PO_2.H_2O$ are dissolved in 100 ml of water, and this solution was held in a heating and cooling mixer with 10 kg of PVDF powder for five minutes at 130° C. and then cooled. The working then continued as in Example 1. The results of the thermogravimetric analysis are shown in Table 1.

EXAMPLE 4

4.5 kg of PVDF powder is mixed vigorously with 0.5 kg of carbon black in a mixer. 2 kg of the mixture is taken out. 1.5 g of finely powdered $NaH_2PO_2.H_2O$ is mixed into the 3 kg remaining in the mixer. The results of the thermogravimetric analysis of the unstabilized and stabilized mixtures are given in Table 1.

EXAMPLE 5

A polymer obtained by the suspension polymerization of vinylidene fluoride in the presence of peroxypivalate is let out of the reaction vessel and filtered. The still moist polymer is divided into two samples and one sample is vigorously stirred with an aqueous solution containing 0.3 weight percent (with respect to the PVDF) of $NaH_2PO_2.H_2O$ and then filtered without further washing. The powder is again divided into two samples, one of which is dried at 80° C. (5a) and the second at 120° C. (5b). The samples were prepared in accordance with Example 1.

Of the untreated polymer, one sample was also dried at 80° C. (5c) and a second at 120° C. (5d) and fabricated into standard test bars in accordance with Example 1 for comparison.

The test bars of the untreated material, which had been dried at 120° C., showed a considerably stronger yellow tint than the bars which had been prepared with the PVDF dried at 80° C. and untreated. The bars prepared with the addition of the phosphinate, however, showed in both cases virtually no yellowing. The results of the thermogravimetric analysis are summarized in Table 1.

TABLE 1

| | Thermogravimetric Analysis (TGA) | | |
|---|---|---|---|
| | | Weight loss at 350° C. rise 8° per minute) | |
| | | after 30 min % | after 60 min % |
| Example 1 | Unstabilized | 3.4 | 5.8 |
| | Stabilized | 0.4 | 0.6 |
| Example 2 | Unstabilized | 3.6 | 7.8 |
| | Stabilized | 0.7 | 1.9 |
| Example 3 | Unstabilized | 2.9 | 4.9 |
| | Stabilized | 0.3 | 0.6 |
| Example 4 | Unstabilized | 11.0 | 15.3 |
| | Stabilized | 3.1 | 5.2 |
| Example 5 | | | |
| 5a) 80° | Stabilized | 0.8 | 1.1 |
| 5c) 80° | Unstabilized | 1.1 | 3.2 |
| 5b) 120° | Stabilized | 0.9 | 1.0 |
| 5d) 120° | Unstabilized | 2.6 | 4.8 |

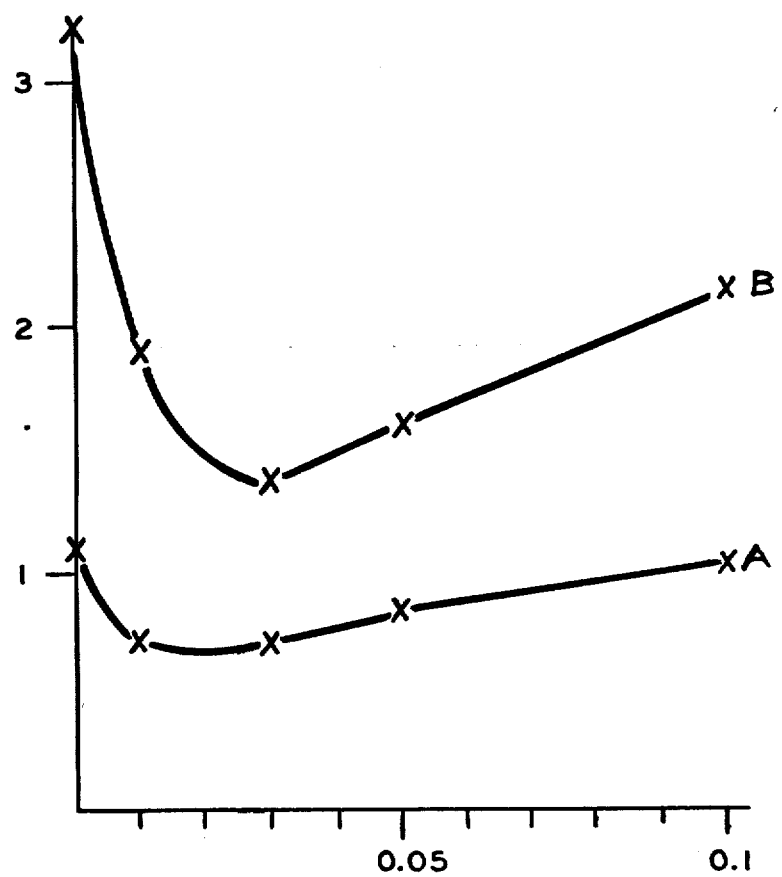

We claim:

1. A stabilized vinylidene fluoride polymer containing composition consisting essentially of a vinylidene fluoride homo- or copolymer and a stabilizing amount of a phosphinate said phosphinate being a $C_1$–$C_8$ alkyl ester of phosphinic acid or an alkaline earth metal salt of phosphinic acid.

2. A composition according to claim 1 wherein said phosphinate is present in the amount of 0.0005 to 1 weight percent based upon the weight of said vinylidene fluoride homo- or copolymer.

3. A composition according to claim 1 additionally containing pentaerythritol or dipentaerythritol.

4. A stabilized vinylidene fluoride homopolymer comprising a vinylidene fluoride homopolymer and a stabilizing amount of a phosphinate.

5. A stabilized vinylidene fluoride polymer according to claim 4 wherein said phosphinate is present in an amount of 0.0005 to 1 weight percent based upon the weight of said vinylidene fluoride homopolymer.

6. A stabilized vinylidene fluoride polymer according to claim 5 wherein said phosphinate is in the form of an alkali metal salt.

7. A stabilized vinylidene fluoride polymer according to claim 5 additionally containing pentaerythritol or dipentaerythritol.

8. A stabilized vinylidene fluoride polymer according to claim 1 wherein said phosphinate is a $C_1$–$C_8$ alkyl ester of phosphinic acid.

9. A stabilized vinylidene fluoride polymer according to claim 1 wherein said phosphinate is an alkaline earth metal salt of phosphinic acid.

10. A process for improving the thermal stability of a polyvinylidene fluoride composition which comprises contacting a solid vinylidene fluoride homopolymer with a stabilizing amount of a phosphinate.

11. A stabilized vinylidene fluoride homopolymer according to claim 4 wherein said phosphinate is $NaH_2PO_2 \cdot H_2O$.

12. A stabilized vinylidene fluoride homopolymer according to claim 4 wherein said phosphinate is a $C_1$–$C_8$ alkyl ester of phosphinic acid.

13. A stabilized vinylidene fluoride homopolymer according to claim 4 wherein said phosphinate is an alkaline earth metal salt of phosphinic acid.

14. A process for improving the thermal stability of a polyvinylidene fluoride composition which comprises contacting a solid vinylidene fluoride polymer with a stabilizing amount of a phosphinate, said phosphinate being a $C_1$–$C_8$ alkyl ester of phosphinic acid or an alkaline earth metal salt of phosphinic acid.

* * * * *

UNITED STATES PATENT AND TRADEMARK OFFICE
CERTIFICATE OF CORRECTION

PATENT NO. : 4,220,572
DATED : September 2, 1980
INVENTOR(S) : WOLFGANG ROHLFING and PETER VANHEIDEN It is certified that error appears in the above—identified patent and that said Letters Patent is hereby corrected as shown below:

| Col. | Line | |
|---|---|---|
| 4 | 22 | before "rise" insert --(Temp.-- |

The attached sheet of drawing should be inserted as part of the above-identified patent.

Signed and Sealed this

Ninth Day of December 1980

[SEAL]

Attest:

SIDNEY A. DIAMOND

Attesting Officer

Commissioner of Patents and Trademarks